United States Patent Office 2,947,768
Patented Aug. 2, 1960

2,947,768

NEW CONDENSATION PRODUCTS, THEIR METAL SALTS AND THEIR METAL COMPOUNDS, AND PROCESS FOR THEIR PRODUCTION

Ernst Bayer, Geilweilerhof, Siebeldingen, Uber Landau, Germany

No Drawing. Filed Dec. 10, 1956, Ser. No. 627,133

Claims priority, application Germany Dec. 15, 1955

5 Claims. (Cl. 260—429.1)

It is known that metal complexes can be prepared from organic o-hydroxyaldehydes and organic diamines. It is furthermore known that the condensation products of phenol and formaldehyde or of melamine, guanidine and formaldehyde can be used as ion exchange resins for the recovery and separation of heavy metals, particularly of uranium.

The present invention relates to new condensation products and their heavy metal salts, particularly the copper and uranyl salts, and heavy metal complex compounds, particularly the copper and uranyl complexes, as well as the process for their production. The new condensation products are condensation products of amino phenols or amino thiophenols with polycarbonyl compounds, especially dicarbonyl compounds and preferably aliphatic dialdehydes. The amino phenols or thiophenols employed in the production of the novel condensation products can contain one or more amino groups.

According to the invention it was found that amino phenols or amino thiophenols, and especially the o-aminophenols and thiophenols, can be reacted with aliphatic or aromatic dicarbonyl compounds to form Schiff's bases. When mono-amino compounds are employed, low molecular weight condensation products which are soluble in water or polar solvents are primarily obtained. When amino compounds are employed which contain two or more amino groups, high molecular weight products are obtained which are not soluble in water or polar solvents. The bond of the metals to the condensation products according to the invention occurs through the main valence of the oxygen or sulfur atom of the phenolic hydroxyl or thiol group by replacement of the hydrogen atom of such group and through subsidiary valences to the nitrogen atom of the imino group.

It was unexpectedly discovered that the condensation products according to the invention have selective affinities to different heavy metal ions. For example, copper and uranyl ions are held particularly firmly by such condensation products. On the other hand, ions of the light metals, such as the alkali metals, calcium, magnesium and the like, are not bound by such condensation products at a pH between 1 and 9.

The condensation products according to the invention can, for example, be produced by reacting the amino phenols or amino thiophenols and the carbonyl compounds in about stoichiometric proportions in a polar solvent, preferably water or alcohols. Depending upon the character of the starting materials employed, either soluble or insoluble condensation products are produced. The condensation can be accelerated by heating and the products can be purified in the usual manner after crystallization by recrystallization. When amino thiophenols are employed, it is advisable to carry out the reaction under exclusion of atmospheric oxygen, preferably under an inert gas in order to avoid oxidation of the amino thiophenol.

The salts and complex compounds of the condensation products according to the invention can be prepared by treating the condensation products with aqueous or alcoholic solutions containing soluble compounds of heavy metals at room or moderately raised temperatures. Usually, difficulty soluble heavy metal compounds or heavy metal complex compounds are obtained but in some instances, for example, in the case of uranium, soluble metal compounds are obtained which, for example, can be recovered from an aqueous solution by shaking out with ether. When high molecular weight water insoluble condensation products are employed, a strong binding of the metals on the condensation product can be observed, but great differences in the strength of the bond can be noticed. For example, copper is bound especially firmly to the condensation products according to the invention and will even displace other heavy metals bound by the condensation products.

The heavy metals can be elutriated with strong acids from the complex compounds formed to liberate the condensation products which can then be reused to bind further quantities of heavy metals. Consequently, it is necessary to employ higher pH values when the complex compounds are to be formed. In general, it is advisable to employ a pH value above 1.8.

The condensation products according to the invention and the heavy metal salts and heavy metal complexes thereof are useful in the purification and recovery of heavy metal values.

The following examples illustrate several modifications of the invention:

Example 1

0.04 mol of sublimed o-amino phenol was dissolved in 1000 cc. of water and 0.025 mol glyoxal dissolved in 20 cc. of methanol were added to such solution. The mixture was then heated for 30 minutes at 80° C. and then placed in a refrigerator for 12 hours whereupon the glyoxal-di-(amino phenol) formed crystallized out in a 90% of theoretical yield. The crystals were filtered off and recrystallized from benzene. Methanol can also be used for such recrystallization.

0.01 mol of the condensation product was dissolved in 1000 cc. of methanol and 500 cc. of methanol containing 0.01 mol of nickel acetate were added to such solution. The mixture was then refluxed and after 12 hours red needles of glyoxal-di(amino phenol)-nickel (II) containing two mol of water in the 5th and 6th coordination positions precipitated out from the deep red solution in 95% of the theoretical yield. The water was split off by heating under vacuum at 120° C. over phosphorus pentoxide.

Example 2

0.01 mol of the condensation product of o-amino phenol and glyoxal obtained as in Example 1 was dissolved in 1000 cc. of methanol. After addition of 100 cc. of 0.1 n-Ba(OH)$_2$ the barium salt thereof is obtained in almost quantitative yield. This salt was recovered in dry form by evaporation of the solvent medium.

Example 3

0.04 mol of sublimed o-amino phenol and 0.025 mol of succindialdehyde were dissolved in 2 liters of water. Thereafter, 0.02 mol of uranyl acetate were added and the mixture boiled under reflux for 1 hour. After 12 hours crystallization the dioxo-succinaldehyde-di(o-amino phenol)-uranium (VI) crystallized out as deep violet needles. The compound was filtered off and recrystallized from chloroform.

Example 4

0.04 mol of o-amino thiophenol and 0.025 mol of methyl glyoxal were dissolved in 1000 cc. of water under a nitrogen atmosphere. The solution was then heated under reflux for 30 minutes while passing a nitrogen stream therethrough. The mixture was then concentrated under vacuum to 250 cc. After 12 hours crystallization methyl glyoxal-di-(o-amino thiophenol) crystallized out in an 80% yield. The crystals were filtered off and dried under vacuum over phosphorus pentoxide.

0.04 mol of such product was dissolved in 1000 cc. of methanol and then 0.04 mol of copper acetate were added thereto and the mixture boiled for two hours under reflux. The mixture was then concentrated under vacuum to 300 cc. After several hours' standing the glyoxal-di(o-amino thiophenol)-Cu(II) crystallized out. It was filtered off and dried at 60° C. over phosphorus pentoxide under vacuum.

*Example 5*

0.1 mol of 2,6-diamino-p-cresol-dihydrochloride was dissolved in 700 cc. of 80% methanol. Thereafter, 200 cc. of a 1 n NaOH were added and then immediately thereafter 0.12 mol of glyoxal were added. After boiling the mixture for four hours under reflux and cooling, the difficultly soluble product precipitated. It was filtered off and dried under vacuum. The yield was 16 g.

100 parts by weight of the thus obtained product was suspended in a copper acetate solution having a pH between 3 to 6 and the mixture shaken for several hours. The 100 parts of the condensation product bound 20 parts of copper as a complex.

*Example 6*

A condensation product of 2.4.6 triamino phenol and methyl glyoxal was prepared in the manner described in Example 5. 100 parts by weight of this insoluble product were suspended at room temperature in solution of the copper tetramine complex, buffered with an ammonia ammonium chloride buffer to a pH of 7 and shaken for five hours. The condensation product bound 20 parts of copper in the form of a complex compound.

*Example 7*

100 parts by weight of the condensation product obtained according to Example 5 were shaken with a solution of uranyl acetate whereby 10 parts of uranium were bound in the form of a complex. The complex compound produced was shaken out 3 times for five hours with 10 parts of an acid at a pH of 2. The uranium quantitatively went into solution whereas the extracted condensation product could again be used for binding further quantities of uranium.

*Example 8*

5 grams of a condensation product of diamino cresol and glyoxal prepared as in Example 5 were suspended in 1 liter of an aqueous solution containing 100 g. of $BaCl_2$, 100 g. of NaCl and 1.5 g. of $Cu(So_4)_2$. After two hours' standing, 70% of the copper contained in the solution was bound by the condensation product. After filtering off the condensation product the solution was again treated with 5 g. of fresh condensation product whereby the copper still remaining in the solution was bound quantitatively. The binding of the copper was selective and the barium and sodium contained in the solution were not taken up by the condensation product.

*Example 9*

A glass tube was filled with the condensation product of diamino cresol and glyoxal prepared as in Example 5. Thereupon a liter of an aqueous solution of uranyl acetate in a quantity to provide 1 g. of uranium per liter, and also containing 100 g. of $MgCl_2$ and 100 g. of KCl was slowly run through the tube at a pH of 4.5. The solution leaving the tube contained no uranium but still contained all of the magnesium and potassium.

*Example 10*

Natural azurite was subjected to a chlorinating roast and dissolved in sulfuric acid to obtain an aqueous solution which in addition to copper also contains alkali and alkaline earth metal salts. Sufficient water was added to such solution that it contained 1 g. of Cu per liter and the pH of such solution was adjusted to 7.1 by the addition of $NH_4Cl$ and $NH_3$. Subsequently the insoluble impurities were filtered off and 1 liter of the solution then shaken for three hours with 10 g. of a condensation product prepared according to Example 6. After this period of time all of the copper was bound by the condensation product but all other metals present remained in solution.

*Example 11*

1 liter of a solution containing 1 g. uranium, as uranyl acetate, 10 g. of zinc chloride, 10 g. of cobalt chloride and 3 g. of nickel chloride was shaken with 10 g. of a condensation product produced according to Example 6 at a pH of 3.5. After 2 hours' shaking, 70% of the uranium originally contained in the solution was bound by the condensation product, whereas hardly any other metal ions were absorbed thereby.

*Example 12*

10 g. of a condensation product prepared according to Example 5 were shaken with 1 liter of an aqueous solution containing 1 g. of cobalt acetate and 1 g. of nickel acetate. After two hours' shaking, 50% of the nickel originally contained in the solution was bound by the condensation product, whereas substantially all of the cobalt remained in solution.

*Example 13*

A saturated solution of 20 g. of the condensation product prepared according to Example 1 in 50% methanol was poured over a solid mixture of 1 g. each of cobalt-, nickel-, zinc-, cadmium- and uranyl acetate and the mixture heated for 10 minutes at 80° C. The uranium went into solution to produce a blue-violet coloration thereof, whereas the remaining metal compounds remained undissolved. The uranium compound was further purified by shaking out with chloroform.

I claim:

1. A compound of a Schiff's base condensation product of an amino compound selected from the group consisting of o-amino phenol, o-amino thiophenol 2,6-diamino-p-cresol and 2,4,6-triamino phenol, and a dicarbonyl compound selected from the group consisting of glyoxal, succindialydehyde and methyl glyoxal with a metal selected from the group consisting of copper, nickel, uranium, cobalt and barium.

2. A copper compound of a Schiff's base condensation product of an amino compound selected from the group consisting of o-amino phenol, o-amino thiophenol 2,6-diamino-p-cresol and 2,4,6-triamino phenol, and a dicarbonyl compound selected from the group consisting of glyoxal, succindialdehyde and methyl glyoxal.

3. A uranium compound of a Schiff's base condensation product of an amino compound selected from the group consisting of o-amino phenol, o-amino thiophenol 2,6-diamino-p-cresol and 2,4,6-triamino phenol, and a dicarbonyl compound selected from the group consisting of glyoxal, succindialdehyde and methyl glyoxal.

4. A process for the production of a compound of a Schiff's base condensation product of an amino compound selected from the group consisting of o-amino phenol, o-amino thiophenol 2,6-diamino-p-cresol and 2,-4,6-triamino phenol, and a dicarbonyl compound selected from the group consisting of glyoxal, succindialdehyde and methyl glyoxal with a metal selected from the group consisting of copper, nickel, uranium, cobalt and barium, which comprises treating the Schiff's base condensation product with a solution selected from the group consisting of aqueous and alcoholic solutions of a soluble compound of a metal selected from the group consisting of copper, nickel, uranium, cobalt and barium at room to moderately raised temperature, said solution being maintained at a pH favoring production of the compound of the Schiff's base condensation product with the metal.

5. The process of claim 4 in which the solution has a pH above 1.8.

References Cited in the file of this patent

UNITED STATES PATENTS 2,147,789  Graves ---------------- Feb. 21, 1939
2,220,065  Clarkson -------------- Nov. 5, 1940